US005332609A

United States Patent [19]

Corn

[11] Patent Number: 5,332,609

[45] Date of Patent: Jul. 26, 1994

[54] INTUMESCENT MOUNTING MAT

[75] Inventor: Stewart H. Corn, St. Paul, Minn.

[73] Assignee: Minnesota Mining and Manufacturing Company, St. Paul, Minn.

[21] Appl. No.: 36,999

[22] Filed: Mar. 25, 1993

[51] Int. Cl.$^5$ .................... B32B 3/06

[52] U.S. Cl. .................... 428/77; 428/195; 428/210; 428/219; 428/220; 428/223; 428/920; 428/921; 422/179

[58] Field of Search .................... 428/77, 195, 210, 219, 428/220, 223, 920, 921; 422/179, 221, 180

[56] References Cited

U.S. PATENT DOCUMENTS

| | | | |
|---|---|---|---|
| Re. 27,747 | 9/1973 | Johnson | 165/166 |
| 3,441,381 | 4/1969 | Keith et al. | 23/288 |
| 3,916,057 | 10/1975 | Hatch et al. | 428/236 |
| 4,048,363 | 9/1977 | Langer et al. | 428/77 |
| 4,265,953 | 5/1981 | Close | 428/78 |
| 4,305,992 | 12/1981 | Langer et al. | 428/324 |
| 4,385,135 | 5/1983 | Langer et al. | 523/179 |
| 4,617,176 | 10/1986 | Merry | 422/179 |
| 4,748,787 | 6/1988 | Harbeke | 52/741 |
| 4,865,818 | 9/1989 | Merry et al. | 422/179 |
| 4,916,800 | 4/1990 | Harbeke | 29/469 |
| 4,999,168 | 3/1991 | Ten Eyck | 422/179 |
| 5,032,441 | 7/1991 | Ten Eyck et al. | 428/77 |
| 5,058,341 | 10/1991 | Harbeke, Jr. | 52/232 |

FOREIGN PATENT DOCUMENTS

| | | |
|---|---|---|
| 0486299A1 | 5/1992 | European Pat. Off. . |
| WO89/04407 | 5/1989 | PCT Int'l Appl. . |

OTHER PUBLICATIONS

SAE Technical Paper Series No. 740244, "Flow Effects in Monolithic Honeycomb Automotive Catalytic Converters," Howitt et al., Mar. 1974.

SAE Technical Paper Series No. 800082, "Thin Wall Ceramics as Monolithic Catalyst Supports," Howitt, Feb. 1980.

SAE Technical Paper Series No. 900500, "Systems Approach to Packaging Design for Automotive Catalytic Converters," Stroom et al., Mar. 1990.

*Primary Examiner*—Alexander S. Thomas
*Attorney, Agent, or Firm*—Gary L. Griswold; Walter N. Kirn; Gregory D. Allen

[57] ABSTRACT

The present invention relates to an intumescent mounting mat useful for mounting monoliths within a casing or container. The mat is useful, for example, for mounting a catalytic converter element in a metallic casing to provide a catalytic converter.

20 Claims, 1 Drawing Sheet

INTUMESCENT MOUNTING MAT

FIELD OF THE INVENTION

The present invention relates to an intumescent mounting mat useful for mounting monoliths within a casing or container.

DESCRIPTION OF THE RELATED ART

Intumescent sheet materials containing unexpanded vermiculite are known in the art to be useful for mounting monolithic shapes (e.g., a catalytic converter element) in a container or a casing.

Catalytic converters utilizing intumescent sheet mounting materials commonly employ a single rectangularly-shaped sheet or mat having a groove on one end and complementarily configured tongue on the other. The sheet or mat is wrapped around the lateral (outer) peripheral surface of a ceramic or metal monolith with the tongue and groove engaged. The joint formed by the tongue and groove is held together, for example, with tape or staple(s).

A problem associated with the use of a single intumescent sheet, however, is that a mat having sufficient thickness to produce adequate mounting pressure between the monolith and the metal casing may not conform adequately to the periphery of the monolith (i.e., wrap around the monolith without undesirable cracking or buckling of the sheet). One solution to this problem is to use a thin intumescent sheet and wrap it many times around the monolith. Other solutions to this problem include those disclosed in U.S. Pat. No. 5,032,441 (Ten Eyck et al.) wherein two plies of intumescent sheet material are adhesively bonded together over a portion of adjoining faces of the sheets; and U.S. Pat. No. 4,048,363 (Langer et al.) wherein laminated intumescent sheet material comprises one intumescent sheet adhesively bonded to another sheet.

SUMMARY OF THE INVENTION

The present invention provides an intumescent mounting mat for use in mounting a monolith within a metallic casing, the intumescent mounting mat comprising a first and a second intumescent sheet each having a major surface, and a second surface opposite the major surface, the intumescent sheets being held together by mechanical fastening means which contacts at least one of the second surfaces and urges the sheets together in forced contact with one another, the sheets being positioned in the mounting mat with at least a portion of the major surface of the first sheet being in contact at an interface area with at least a portion of a major surface of the second sheet. Preferably, the mechanical fastening means contacts both of the second surfaces. The fastening means which contacts and urges the second surface together in forced contact is independent of any force exerted onto the second surfaces from the metallic casing and the monolith.

In another aspect, the present invention provides a catalytic converter comprising a metallic casing, a catalytic converter element disposed within the metallic casing, and the intumescent mounting mat according to the present invention disposed between the catalytic converter element and the metallic casing for positioning the catalytic element within the metallic casing and for absorbing mechanical and thermal shock.

Various embodiments of the mounting mat according to the present invention typically use less organic adhesive material to hold the intumescent sheets together than do conventional methods of gluing portions of the sheets together. The use of less organic adhesive material reduces the amount of fumes released when the mat is heated above about 250° C. Further, various embodiments of the mounting mat according to the present invention offer processing advantages over conventional methods of gluing portions of the sheets together. For example, the use of adhesive tape, string, rope, wire, ceramic (i.e., crystalline ceramic, glass, or glass-ceramic) fiber(s) or yarn(s), rubber band(s), clip(s), or staple(s) to hold the intumescent sheets together do not need to involve providing a suitable time and environment for a glue to cure.

DETAILED DESCRIPTION OF THE PREFERRED EMBODIMENT

Figure 1:
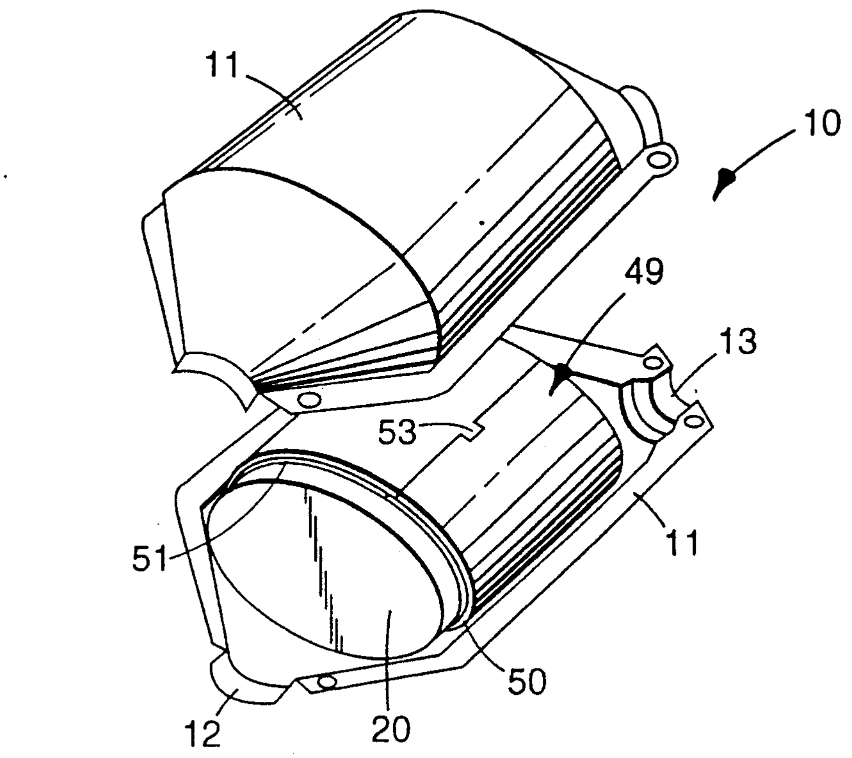
FIG. 1 is a perspective view of a catalytic converter according to the present invention shown in disassembled relation.
Figure 2:
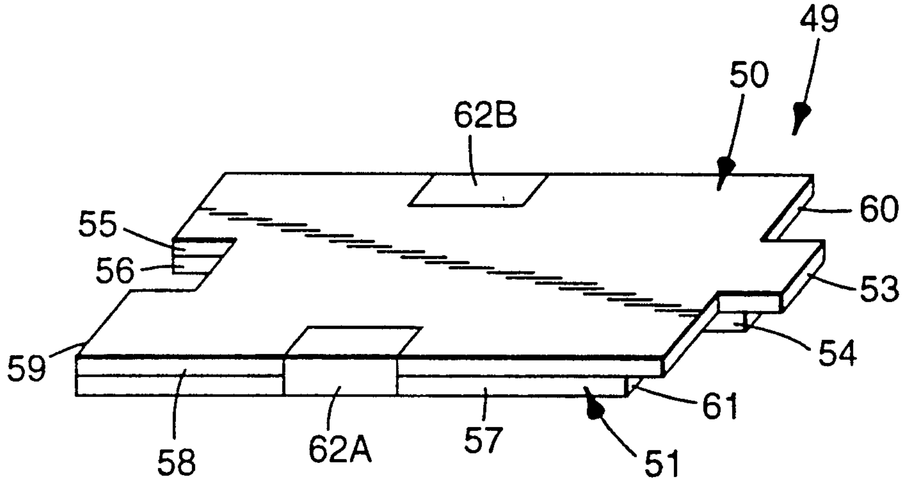
FIG. 2 is an embodiment of an intumescent mounting mat according to the present invention.

Referring to FIGS. 1 and 2, catalytic converter 10 comprises metallic casing 11 with generally frustoconical inlet and outlet ends 12 and 13, respectively. Disposed within casing 11 is monolithic catalytic element 20 formed of a honeycombed monolithic body having a plurality of gas flow channels (not shown) therethrough. Surrounding catalytic element 20 is mounting mat 49 comprising intumescent sheets 50 and 51 held together by a force exerted onto adjoining major surfaces which serves to tightly but resiliently support catalytic element 20 within casing 11. Mounting mat 49 holds catalytic element 20 in place in casing 11 and seals the gap between catalytic element 20 and casing 11 to thus prevent or minimize exhaust gases from by-passing catalytic element 20.

Mounting mat 49 comprises intumescent sheets 50 and 51 each having tongue 53 and 54, respectively, and groove 55 and 56, respectively. Sheets 50 and 51 are placed together and aligned so that lengthwise edges 57 and 58 are even. Further, sheets 50 and 51 are aligned at crosswise edge 59 (i.e., the edge having the groove) and offset at crosswise edge 60 (i.e., the edge having the tongue) of sheet 50 and crosswise edge 61 of sheet 51. In order to be offset at crosswise edge 59, one sheet is slightly longer than the other in the lengthwise direction. Sheets 50 and 51 are held together by pieces of tape 62A and 62B which are placed close to crosswise edge 59. Alternatively, the sheets can be offset at both crosswise edges 59 and 60.

The metallic casing can be made from suitable materials known in the art for such use. Preferably, the casing is made of stainless steel.

The monolithic shape can be, for example, a catalytic converter element. Suitable catalytic converter elements are known in the art and include those made of metal or ceramic. A useful catalytic converter element is disclosed, for example, in U.S. Pat. No. RE 27,747 (Johnson), the disclosure of which is incorporated herein by reference for its teaching of catalytic converter elements. Further, ceramic catalytic converter elements are commercially available from Corning Inc. of Corning, N.Y., and NGK Insulated Ltd. of Nagoya, Japan. For example, a honeycomb ceramic catalyst support is marketed under the trade designation "CELCOR" by Corning Inc. and "HONEYCERAM" by NGK Insulated Ltd. Metal catalytic converter elements are commercially available, for example, from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974, the disclosures of which are incorporated herein by reference for their teaching of catalytic converters.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.), the disclosure of which is incorporated herein by reference for its teaching of catalytic coatings.

The intumescent sheet material used depends on the application. Factors to consider include the use temperature and the type of monolith (e.g., ceramic monolith or metallic monolith). Suitable intumescent sheet materials typically comprise unexpanded vermiculite (i.e., vermiculite ore (commercially available, for example, from W. R. Grace and Co. of Baltimore, Md.)) organic binder and/or inorganic binder, and filler (e.g., bentonitc, ceramic (i.e., crystalline ceramic, glass, or glass-ceramic) fibers (preferably, glass fibers), and/or hollow ceramic (preferably, glass) microspheres. For example, U.S. Pat. No. 3,916,057 (Hatch et al.), the disclosure of which is incorporated herein by reference for its teaching of intumescent sheet material, discloses intumescent sheet material comprising unexpanded vermiculite, inorganic fibrous material, and inorganic binder. U.S. Pat. No. 4,305,992 (Langer et al.), the disclosure of which is incorporated herein by reference for its teaching of intumescent sheet material, discloses intumescent sheet material comprising ammonium ion treated vermiculite, inorganic fibrous material, and organic binder. Further, intumescent sheet material is commercially available, for example, from the 3M Company of St. Paul, Minn., under the trade designation "INTERAM MAT MOUNT."

Suitable organic binders are known in the art for such use and include polymers and elastomers in the latex form (e.g., natural rubber latices, styrene-butadiene latices, butadiene-acrylonitrile latices, and latices of acrylate and methacrylate polymers and copolymers). Suitable inorganic binders are known in the art for such use and include tetrasilisic fluorine mica, in either the water-swelling unexchanged form or after flocculation as the exchanged salt with a di- or polyvalent cation, and bentonite.

The size and shape of the intumescent mounting mat according to the present invention depends on the application requirements. Although the intumescent mounting mat according to the present invention can comprise two or more intumescent sheets, the mat is usually comprised of two sheets. Typically, the thickness of each intumescent sheet is in the range from about 1.5 mm to about 10 mm. Preferably, the intumescent sheets have substantially the same thickness. If the mounting mat is used to mount a catalytic converter, the preferred thickness of each intumescent sheet is in the range from about 4 mm to about 6 mm for a single sheet, or about 8 to about 12 mm for a total (uncompressed) mat thickness.

In another aspect, the weight per unit area value of each intumescent sheet typically ranges from about 1000 $g/m^2$ to about 6000 $g/m^2$. If the mounting mat is used to mount a ceramic automotive catalytic converter, the preferred weight per unit area value of each intumescent sheet is in the range from about 2500 $g/m^2$ to about 4500 $g/m^2$.

The sheets are held together by a mechanical fastening means and wrapped around a monolith (e.g., a catalytic converter). Because the outer intumescent sheet must wrap around a larger circumference than the inner intumescent sheet, the outer sheet will slide past the inner sheet. Preferably, each sheet is thin enough to remain conformable and flexible such that the sheets can be wrapped around the monolith without undesirable buckling or cracking.

Suitable mechanical fastening means include adhesive tape, string, rope, wire, ceramic (i.e., crystalline ceramic, glass, or glass-ceramic) fiber or yarn, rubber band, clip, staple, and the like (e.g., a sheet material wrapped around the intumescent sheets). Care should be taken in applying the force so as to minimize or avoid damage to the intumescent mounting mat and/or the monolithic shape. A staple holding the intumescent sheets together may penetrate the thickness of a first sheet but not fully penetrate the thickness of a contacting second sheet. That is, a staple need not necessarily penetrate the thickness of two contacting intumescent sheets, nor need a staple necessarily contact the second surfaces of two contacting sheets.

Preferably, the mechanical fastening means is adhesive tape. Suitable adhesive tapes include conventional adhesive tapes such as masking tape (commercially available, for example, under the product number "250" from the 3M Company) and filament tape (commercially available, for example, under the trade designation "SCOTCH BRAND FILAMENT TAPE" from the 3M Company). It is preferable to use a pressure sensitive adhesive tape (e.g., that commercially available under the trade designation "3M BRAND #375 PRESSURE SENSITIVE ADHESIVE TAPE" from the 3M Company).

The mechanical fastening means can be positioned at, and contacted to, any convenient location on the second surface (e.g., near one end of the intumescent sheets or in the middle between the ends of the sheets) of the intumescent sheets. For ease of application, the mechanical fastening means is preferably positioned close to the end where the sheets are aligned at a crosswise edge. The tape can be wrapped completely around the intumescent sheets or it can be only partially wrapped around the sheets (see e.g., tapes 62A and 62B in FIG. 2). In wrapping tape completely around the intumescent sheets, ends of the tape can be abutted, or one end can overlap the other.

If the mechanical fastening means is positioned in the middle of the intumescent sheets between the ends and the intumescent sheets have different lengths, the shorter sheet is preferably centered between the ends of the longer sheet.

Preferably, adjoining, contacting major surfaces of the intumescent sheets are essentially free of adhesive (i.e., rubber-based adhesive, pressure-sensitive adhesive, epoxy compositions, or any material which acts as a coating to adhere one sheet to the other).

The mechanical fastening means preferably permits movement of the sheets relative to each other in at least one direction along an axis which extends to opposite ends of the mounting mat while the mechanical fastening means continues to maintain the forced contact between the sheets. Preferably, the intumescent mounting mat has complementary ends and the intumescent sheets are offset a predetermined amount along this axis extending to opposite ends. The intumescent sheets are preferably offset a predetermined amount along the axis extending to opposite ends such that the intumescent mounting mat is capable of being wrapped around a monolith with the complementary ends joined without undesirable cracking or buckling of the sheets. After wrapping, the ends are aligned and ready to be taped down, stapled to the monolith, or otherwise secured.

In another aspect, the intumescent mounting mat, according to the present invention, preferably has an axis which is perpendicular to the major surfaces and extends through each sheet, and the fastening means prevents rotation of one sheet with respect to the other sheet about the axis.

The intumescent mat according to the present invention is useful in mounting a monolith (e.g., a catalytic converter element) in a metallic casing. The intumescent mat typically expands at temperatures above about 300° C. for mats incorporating treated vermiculite and above about 375° C. for mats incorporating (untreated) vermiculite. Such temperatures are commonly encountered, for example, during use as a catalytic converter mounting mat.

Objects and advantages of this invention are further illustrated by the following examples, but the particular materials and amounts thereof recited in these examples, as well as other conditions and details, should not be construed to unduly limit this invention.

EXAMPLES

Examples 1 and 2 illustrate the use of intumescent mounting mats according to the present invention in an automobile catalytic converter for gasoline engines having a monolithic ceramic catalytic converter element.

Example 1

Two 4.9 mm thick intumescent sheets comprising ammonium ion treated vermiculite, inorganic fibrous material, and binder (described in U.S. Pat. No. 4,305,992 (Langer et al.), the disclosure of which is incorporated herein by reference for its teaching of the intumescent sheet material) were cut into rectangular pieces having a tongue and a groove. The dimensions of the rectangular pieces were about 9 cm by 35.5 cm and about 9 cm by 39 cm, respectively.

One sheet was placed on top of the other and positioned so that they were aligned at their lengthwise edges with the grooves at one end and the tongues at the other. Further, the grooved edges were aligned.

Two 7.6 cm (3 inches) wide, 10 cm long pieces of adhesive tape (commercially available under the trade designation "3M BRAND #375 PRESSURE SENSITIVE ADHESIVE TAPE" from the 3M Company) were used to fasten the two sheets together as shown in FIG. 2. Each piece of tape was positioned approximately 1 cm from the grooved end.

The taped sheets were wrapped around an oval ceramic monolith wherein the oval had dimensions of 12 cm (long axis) by 7.8 cm (short axis) honeycombed (62 cells/cm$^2$ (400 cells/in.$^2$)) cordierite monolith available under the trade designation "CELCOR" from Corning, Inc. of Corning, N.Y. The intumescent mat was wrapped around the monolith. The tongue and groove of the mat were then aligned. A 2.5 cm wide, 10 cm long piece of masking tape (commercially available under the product number "250" from the 3M Company) was used to hold the tongued and grooved ends together. The shorter of the two sheets was adjacent the ceramic monolith. The mounting mat conformed to the shape of the monolith without undesirable cracking or buckling of the sheets.

Example 2

Example 2 was prepared as described in Example 1 except one 18 cm long piece of tape was used to fasten the two sheets together. The tape was positioned approximately 1 cm from the grooved end and centered on the exposed major surface of the longer intumescent sheet. The mounting mat conformed to the shape of the monolith without undesirable cracking or buckling of the sheets.

Examples 3 and 4 illustrate the use of intumescent mounting mats according to the present invention in a diesel catalytic converter for diesel engines having a monolithic ceramic catalytic converter element.

Example 3

Two 5.5 mm thick intumescent sheet material comprising unexpanded vermiculite, inorganic fibrous material, and inorganic binder (described in U.S. Pat. No. 3,916,057 (Hatch et al.), the disclosure of which is incorporated herein by reference for its teaching of the intumescent sheet material) were cut into rectangular pieces having a tongue and a groove. The dimensions of the rectangular pieces were about 9 cm by 73.5 cm and about 9 cm by 77 cm, respectively.

One sheet was placed on top of the other and positioned so that they were aligned at their lengthwise edges with the grooves at one end and the tongues at the other. The crosswise edges were offset such that the shorter intumescent sheet was centered on the longer intumescent sheet.

Two 7.6 cm (3 inches) wide, 10 cm long pieces of adhesive tape ("3M BRAND #375 PRESSURE SENSITIVE ADHESIVE TAPE") were used to fasten the two sheets together as shown in FIG. 2. Each piece of tape was positioned approximately 1 cm from the grooved end.

The taped sheets were wrapped around a 24 cm diameter, 15 cm long ceramic monolith honeycombed (62 cells/cm$^2$ (400 cells/in.$^2$)) cordierite monolith available under the trade designation "CELCOR" from Corning, Inc. The intumescent mat was wrapped around the monolith. The tongue and groove of the mat were then aligned. A 2.5 cm wide, 10 cm long piece of masking tape ("250") was used to hold the tongued and grooved ends together. The shorter of the two sheets was adjacent the ceramic monolith. The mounting mat conformed to the shape of the monolith without undesirable cracking or buckling of the sheets.

Example 4

Example 4 was prepared as described in Example 3 except one 25 cm long piece of tape was used to fasten the two sheets together. The tape was positioned approximately 1 cm from the grooved end and centered on the exposed major surface of the longer intumescent sheet. The mounting mat conformed to the shape of the monolith without undesirable cracking or buckling of the sheets.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A catalytic converter comprising a metallic casing, a catalytic converter element disposed within said metallic casing, and an intumescent mounting mat disposed between said catalytic converter element and said metallic casing for positioning said catalytic element within said metallic casing and for absorbing mechanical and thermal shock, said intumescent mounting mat comprising a first and a second intumescent sheet each having a major surface, and a second surface opposite said major surface, said intumescent sheets being held together by mechanical fastening means which contacts each of said second surfaces and urges said sheets together in forced contact with one another, said sheets being positioned in said mounting mat with at least a portion of said major surface of said first sheet being in contact at an interface area with at least a portion of a major surface of said second sheet, and said mechanical fastening means being adhesive tape.

2. A catalytic converter according to claim 1 wherein said mechanical fastening means permits movement of said sheets relative to each other in at least one direction along an axis which extends to opposite ends of said mounting mat while said mechanical fastening means continues to maintain said forced contact between said sheets.

3. A catalytic converter according to claim 2 wherein said intumescent mounting mat has complementary ends, said complementary ends and said intumescent sheets are offset a predetermined amount along said axis such that said intumescent mounting mat is capable of being and is bent around said catalytic converter element with said complementary ends joined.

4. A catalytic converter according to claim 1 wherein said catalytic converter element is a ceramic catalytic converter element.

5. A catalytic converter according to claim 1 wherein said mounting mat has an axis which is perpendicular to said major surfaces and extends through each sheet and said fastening means prevents rotation of one sheet with respect to the other sheet about said axis.

6. A catalytic converter according to claim 1 wherein said intumescent sheets comprise unexpanded vermiculite, organic binder, and filler.

7. A catalytic converter according to claim 1 wherein each of said intumescent sheets has a thickness which is substantially the same.

8. A catalytic converter according to claim 1 wherein each of said intumescent sheets independently has a thickness in the range from about 4 mm to about 6 mm.

9. A catalytic converter according to claim 1 wherein each of said intumescent sheets has a weight per unit area value in the range from about 2500 $g/m^2$ to about 4500 $g/m^2$.

10. A catalytic converter according to claim 1 wherein said at least a portion of said major surface of said first sheet being in contact at an interface area with at least a portion of a major surface of said second sheet is essentially free of adhesive.

11. A catalytic converter comprising a metallic casing, a catalytic converter element disposed within said metallic casing, and an intumescent mounting mat disposed between said catalytic converter element and said metallic casing for positioning said catalytic element within said metallic casing and for absorbing mechanical and thermal shock, said intumescent mounting mat comprising a first and a second intumescent sheet each having a major surface, and a second surface opposite said major surface, said intumescent sheets being held together by mechanical fastening means which contacts each of said second surfaces and urges said sheets together in forced contact with one another, said sheets being positioned in said mounting mat with at least a portion of said major surface of said first sheet being in contact at an interface area with at least a portion of a major surface of said second sheet.

12. A catalytic converter according to claim 11 wherein said catalytic converter element is a ceramic catalytic converter element.

13. A catalytic converter comprising a metallic casing, a catalytic converter element disposed within said metallic casing, and an intumescent mounting mat disposed between said catalytic converter element and said metallic casing for positioning said catalytic element within said metallic casing and for absorbing mechanical and thermal shock, said intumescent mounting mat comprising a first and a second intumescent sheet each having a major surface, and a second surface opposite said major surface, said intumescent sheets being held together by mechanical fastening means which contacts at least one of said second surfaces and urges said sheets together in forced contact with one another, said sheet being positioned in said mounting mat with at least a portion of said major surface of said first sheet being in contact at an interface area with at least a portion of a major surface of said second sheet.

14. A catalytic converter according to claim 13 wherein said catalytic converter element is a ceramic catalytic converter element.

15. A catalytic converter according to claim 13 wherein said mounting mat has an axis which is perpendicular to said major surfaces and extends through each sheet and said fastening means prevents rotation of one sheet with respect to the other sheet about said axis.

16. A catalytic converter according to claim 13 wherein said intumescent sheets comprise unexpanded vermiculite, organic binder, and filler.

17. A catalytic converter according to claim 13 wherein each of said intumescent sheets has a thickness which is substantially the same.

18. A catalytic converter according to claim 13 wherein each of said intumescent sheets independently has a thickness in the range from about 4 mm to about 6 mm.

19. A catalytic converter according to claim 13 wherein each of said intumescent sheets has a weight per unit area value in the range from about 2500 $g/m^2$ to about 4500 $g/m^2$.

20. A catalytic converter according to claim 13 wherein said at least a portion of said major surface of said first sheet being in contact at an interface area with at least a portion of a major surface of said second sheet is essentially free of adhesive.

* * * * *